United States Patent [19]

Oono

[11] Patent Number: 5,276,497
[45] Date of Patent: Jan. 4, 1994

[54] MEASURING APPARATUS OF MIRROR SURFACE

[75] Inventor: Masahiro Oono, Tokyo, Japan

[73] Assignee: Asahi Kogaku Kogyo Kabushiki Kaisha, Tokyo, Japan

[21] Appl. No.: 822,660

[22] Filed: Jan. 21, 1992

[30] Foreign Application Priority Data

Jan. 22, 1991 [JP] Japan .................. 3-81048
Dec. 12, 1991 [JP] Japan .................. 3-351432

[51] Int. Cl.⁵ .................................. G01B 11/00
[52] U.S. Cl. ........................ 356/153; 356/154; 356/373
[58] Field of Search ............ 356/138, 153, 154, 373, 356/375

[56] References Cited

U.S. PATENT DOCUMENTS 3,628,869 12/1971 Clay et al. ..................... 356/153
3,915,575 10/1975 Sick ............................ 356/154
4,868,377 9/1989 Nishikawa.

FOREIGN PATENT DOCUMENTS 1178972 1/1970 United Kingdom .......... 356/153

Primary Examiner—F. L. Evans
Attorney, Agent, or Firm—Sandler, Greenblum & Bernstein

[57] ABSTRACT

An apparatus for measuring the deviation from a specific position of a mirror surface, includes an auto collimating system in which a point light source is located at a reference point on a reflecting surface of the mirror surface located at a predetermined correct position. A light emitter emits detecting light onto the point light source from an incident optical axis inclined with respect to a normal of the mirror surface. A position detector measures the deviation of the detecting light reflected by the mirror surface and reciprocally transmitted through the auto collimating system and again reflected by the mirror surface.

18 Claims, 3 Drawing Sheets

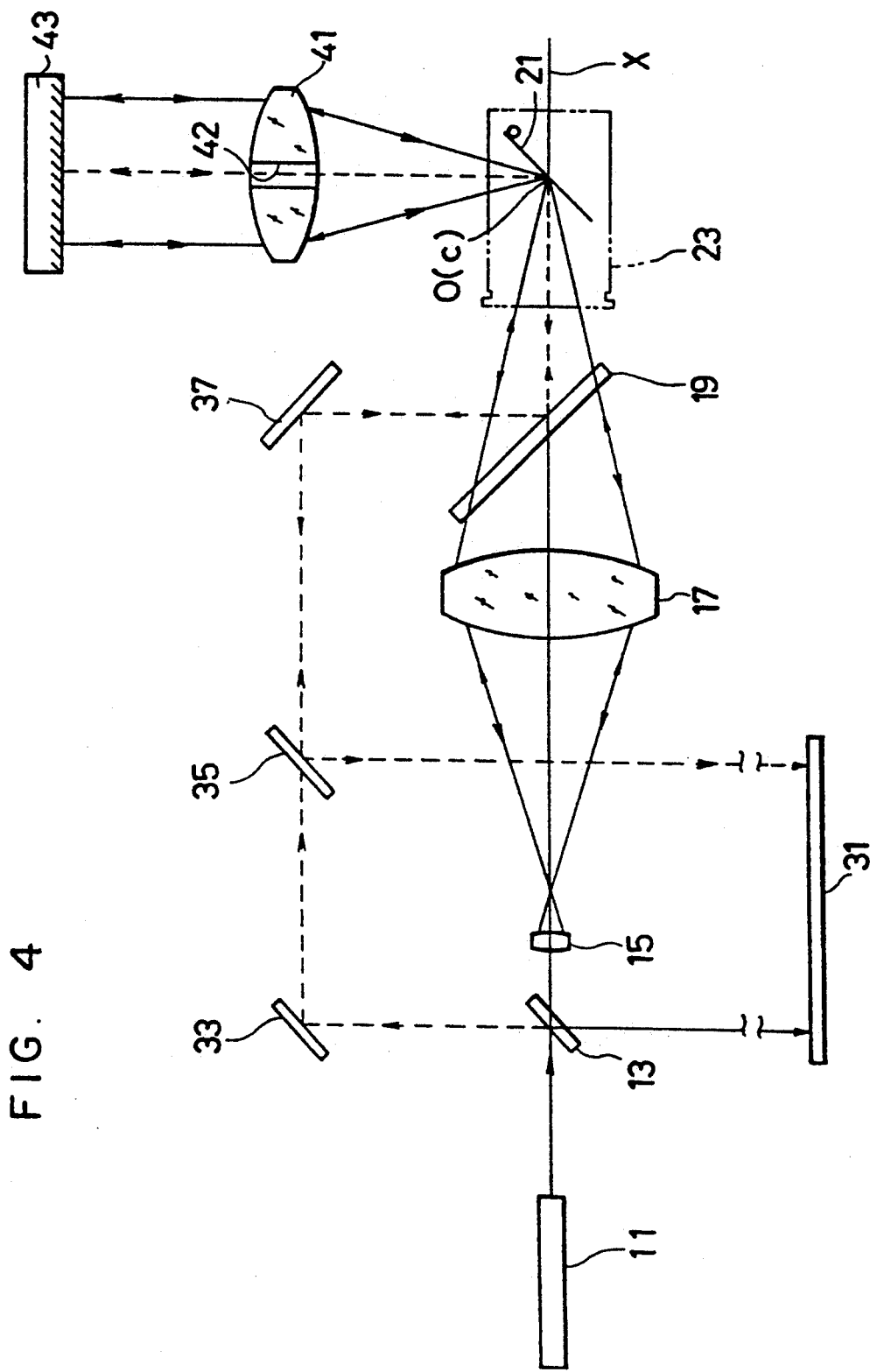

MEASURING APPARATUS OF MIRROR SURFACE

BACKGROUND OF THE INVENTION

Field of the Invention

The present invention relates to a mirror surface measuring apparatus which can be used to measure, for example, an inclination angle and/or a position, etc., of a reflection surface of a movable mirror in a single lens reflex camera.

Description of Related Art

In a conventional view finder of a single lens reflex camera, the light flux of an object transmitted through the taking lens is reflected by a movable mirror, such as a quick return mirror, toward a finder optical system, so that an object image can be formed on a screen lying in a plane which is spaced from the mirror at the same distance as the film plane but orthogonal thereto. The object image on the screen is observed through a pentagonal prism and an eyepiece.

If the inclination angle of the movable mirror does not meet an intended design value, the object image will be distorted or partially out of focus, or parallax might occur in which the range of the image in the finder might not be identical to the range of an actual object image exposed on the film. Furthermore, parallax error can also occur when the position of the movable mirror in the optical axis direction is deviated from a predetermined design value. To avoid these problems, it is necessary to measure or detect the inclination angle and the axial position of the movable mirror, upon assembly thereof.

The significant requirements needed to measure the inclination angle and the axial position of the movable mirror are ① non-contact measurement, ② quick measurement, and ③ selection of simultaneous or independent measurement of the angle and the position, etc.

Among the known measuring methods are the contact-probe method, the microscope method, and the auto-collimating method. In the contact-probe method, since a probe is brought into contact with a mirror to be measured, the mirror can be damaged. Furthermore, the measurement and adjustment can not be effected simultaneously.

A major disadvantage of the microscope method is that it requires a long time to complete the measurement. In the auto-collimating method, the detection of the position cannot be carried out while the angle is being detected.

SUMMARY OF THE INVENTION

The primary object of the present invention is to provide a mirror surface measuring apparatus which satisfies all the requirements mentioned above.

To achieve this object, according to the present invention, there is provided an apparatus for measuring the deviation of a mirror surface from a specific position, which includes an auto collimating system in which a point light source is located at a reference point (predetermined position) on a reflecting surface of the mirror. A light emitting means emits detecting light onto the point light source from an incident optical axis which is inclined with respect to a normal of the mirror surface. A position detecting means measures the deviation of the detecting light reflected by the mirror surface which is reciprocally transmitted through the auto collimating system and reflected again by the mirror surface.

The detecting light incident upon the reference point can be a converged light and the reflected light can be converged onto the position detecting means.

According to another aspect of the present invention, there is provided an apparatus for measuring the deviation from a specific position of a mirror surface. The apparatus includes an auto collimating lens system in which a point light source is located at a reference point on a reflecting surface of the mirror surface located at a predetermined correct angular and axial position. A light emitting emits detecting light, and a convergent optical system converges the detecting light emitted by the emitting means onto the reference point from an incident optical axis inclined with respect to a normal of the mirror surface at the reference point. A position detecting means measures the deviation of the detecting light which is reflected by the mirror surface, reciprocally transmitted through the auto collimating lens system, and reflected again by the mirror surface to be converged by the convergent optical system. A beam emitting means emits a beam-like detecting light onto the reference point from the optical axis, and a plane mirror having a reflecting surface perpendicular to the beam like detecting light reflected by the mirror surface is positioned at the correct angular and axial location. An angle detecting means detects the inclination angle of the mirror surface with respect to the correct angular position, based on a deviation of the beam like detecting light reflected by the mirror surface, the plane mirror, and again by the mirror surface.

With this arrangement, the detection of the axial position and angle of the mirror surface can be independently and simultaneously effected.

The present disclosure relates to subject matter contained in Japanese patent application Nos. 03-81048 (filed on Jan. 22, 1991) and 03-351432 (filed Dec. 12, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 2:
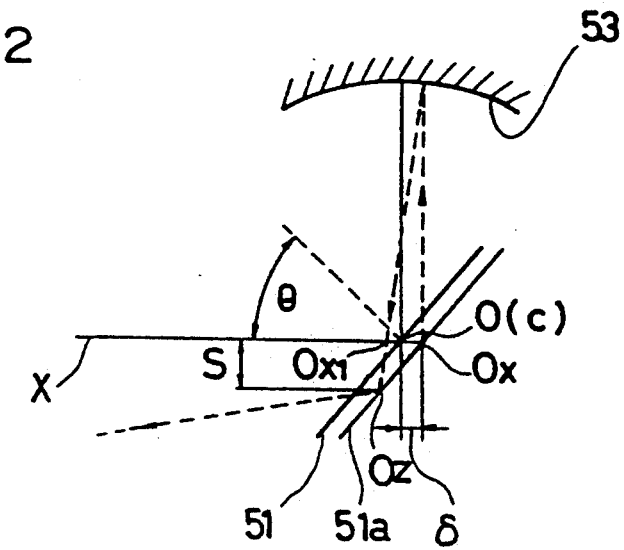
FIG. 2 is a schematic view showing the principle of measurement of a position, according to the present invention.

FIG. 2 shows the principle of measurement of the position of a mirror according to the present invention. Note that in FIG. 2, light is represented by a principal ray for simplicity and clarity.

A movable mirror 51, corresponding to a mirror surface which is to be measured, is oriented at a predetermined position and inclined at a predetermined angle, so that a normal of the mirror surface is inclined at an angle $\theta$ (design value) with respect to the optical axis X. The intersecting point between the optical axis X and the reflection surface of the movable mirror 51 defines a reference position (reference point) ○. A concave mirror 53 is located so that a center of curvature C thereof is identical to the reference point ○.

In this state, when a detection light coincidental with the optical axis X is made incident upon the movable mirror 51, the detection light is reflected by the reflection surface of the movable mirror 51 at the reference point ○, and is then reflected by the concave surface 53. The reflected detection light returns along the same light path as the incident light path, since the light is reflected by the mirror 53 at the center of the curvature C of the concave mirror 53. Namely, the light reflected by the concave mirror 53 is reflected by the movable mirror 51 in the direction of the optical axis X.

If the movable mirror 51 is deviated, for example rearwardly, from the reference position ○ by an amount of deviation δ, as shown by the movable mirror position 51a in FIG. 2, the detecting light along the optical axis X is reflected by the movable mirror 51 at position 51a at the point ○x spaced from the reference point ○ along the optical axis X at a deviation δ. The light reflected by the movable mirror 51a is then reflected by the concave mirror 53 before intersecting the optical axis X at a point ○x1 which is substantially symmetrical with the point ○x about the reference point ○ on the optical axis. The detection light is then reflected by the movable mirror 51a at a point ○z which is spaced on a normal of the optical axis X at a distance S. If the value of deviation δ is very small, it is given by the following formula;

$$\delta \approx S/(2 \sin 2\theta)$$

As can be seen from the above discussion, the deviation δ can be obtained when the distance S is detected, based on the light reflected by the movable mirror 51 (51a).

Generally, the angle θ is 45° in a single lens reflex camera (θ=45°), and accordingly;

$$\delta \approx S/\{2 \sin (2 \times 45°)\} = S/2$$

Figure 3:
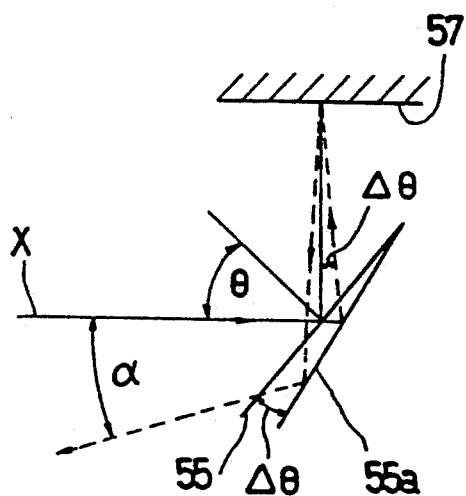
FIG. 3 is a schematic view showing the principle of measurement of an angle, according to the present invention; and, FIG. 4 is a schematic view of the optical paths of a measuring apparatus according to another aspect of the present invention.

FIG. 3 shows the principle of measurement of an angle. In FIG. 3, light incident upon the movable mirror 55 along the optical axis X is reflected thereby and then by a plane mirror 57. The light reflected by the plane mirror 57 is returned to the optical axis X along the same path. However, if there is an angular deviation Δθ of the movable mirror 55 from a design value θ, as shown by the movable mirror position 55a in FIG. 3, the light reflected by the plane mirror 57 toward the movable mirror 55 at position 55a is reflected by the latter at an angle α with respect to the optical axis X (incident light).

Here, the angular deviation Δθ can be given by;

$$\Delta\theta = \alpha/4$$

Namely, the angular deviation Δθ is obtained by detecting the angle α.

Figure 1:
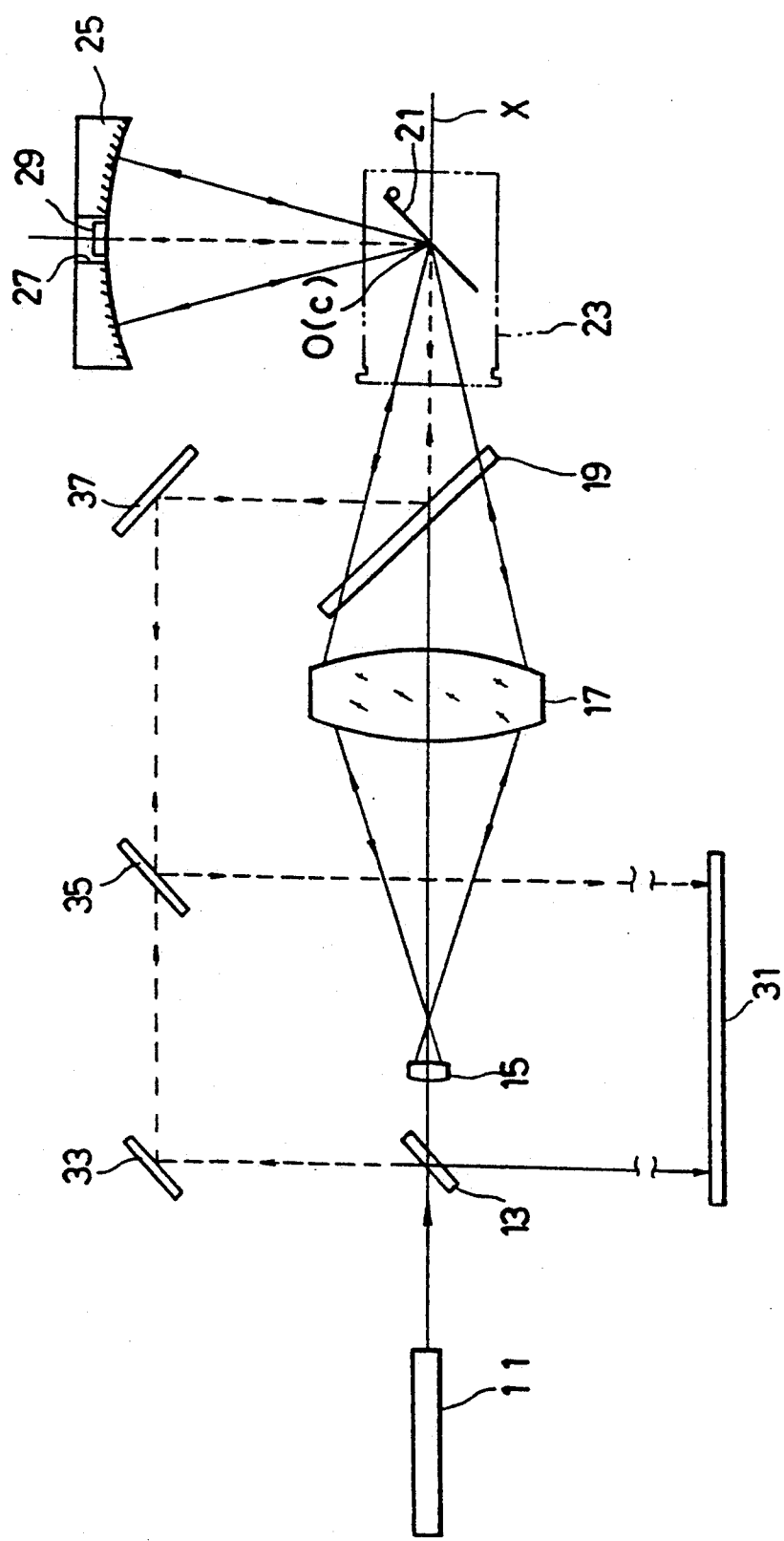
FIG. 1 is a schematic view of the optical paths of a measuring apparatus according to the present invention.

FIG. 1 shows a first embodiment of an optical arrangement of a measuring apparatus according to the present invention.

The basic concept of the measuring apparatus shown in FIG. 1 is a combination of a position detecting apparatus shown in FIG. 2 and an angle detection apparatus (collimator) shown in FIG. 3.

A laser (detection light) emitted from a laser source (e.g., laser diode) 11 is partially transmitted through a first half-mirror 13 and is then converged onto the reference point ○ at which point the optical axis X intersects the reflection surface of the movable mirror 21 (oriented at a predetermined design position) through an objective lens 15 and a condenser lens 17. A second half-mirror 19 is provided between the condenser lens 17 and the movable mirror 21. The objective lens 15 and the condenser lens 17 comprise first and second converging optical systems, respectively.

The concave mirror 25 is positioned to face the light reflected by the movable mirror 21 in which direction a screen (not shown) and a pentagonal prism (not shown), etc., are to be provided. The center of curvature C of the concave mirror 25 is coincidental with the reference point ○. A hole 27 is provided at the center of the concave mirror 25 in which a plane mirror 29 is located, so that a normal to the reflecting surface thereof is parallel with the detection light reflected by the movable mirror 21 toward the concave mirror 25.

The convergent bundle of rays reflected by the concave mirror 25 is converged onto the movable mirror 21 and is reflected thereby toward the condenser lens 17. The light reflected by the movable mirror 21 is transmitted through the second half-mirror 19 and converged by the condenser lens 17 and the objective lens 15. Thereafter, the light is partly reflected by the first half-mirror 13 in the downward direction, as can be seen in the illustrated embodiment, toward a measuring screen (measuring plane) 31. The position (positional deviation) of the movable mirror 21 can be detected, based on the position of the convergent bundle of rays received by the measuring screen 31. It should be noted that since the detection light is not a beam but a convergent bundle of rays converged onto the movable mirror 21 at the reference point ○, a very small light spot can be formed on the movable mirror 21, resulting in an increased resolving power of measurement. Furthermore, this allows for the provision of the plane mirror 29 in the concave mirror 25.

In addition to the foregoing, since the light reflected by the concave mirror 25 is reflected by the movable mirror 21 and is incident upon the measuring screen 31 through the condenser lens 17, the measurement can be effected regardless of a change in the angle of the movable mirror 21. Namely, so long as there is no positional deviation of the movable mirror 21, the return light transmitted through the condenser lens 17 will always be converged onto the same point as that of the incident light on the objective lens 15 from the laser source 11, regardless of (a change in) the inclination angle of the movable mirror 21.

On the other hand, a part of the laser emitted from the laser source 11 is reflected upward by the first half-mirror 13, as shown by a dotted line in FIG. 1. The laser is reflected by the first half-mirror 13 and a first mirror 33 and is then transmitted through a third half-mirror 35. Thereafter, the light is reflected by a second mirror 37 toward the second half-mirror 19 which reflects the light toward the movable mirror 21. The light reflected by the movable mirror 21 toward the plane mirror 29 is reflected thereby toward the movable mirror 21. The light is returned to the third half-mirror 35 along the same path in the opposite direction. The light is then partly reflected by the third half-mirror 35 toward the measuring screen 31. The inclination angle of the movable mirror 21 is detected by detecting the position of the laser beam incident upon the measuring screen 31.

As can be understood from the foregoing, the use of the collimated beam like detection light (laser beam) makes it possible to detect the angle of the movable mirror 21, regardless of a change in the axial position of the movable mirror 21.

The laser source 11, the concave mirror 25 and the other elements are provided on a base (not shown) of the apparatus. The movable mirror 21 is mounted to a mirror box 23 which is detachably attached to the base.

The measuring screen 31 is provided with, for example, a pair of cross lines (not shown) having origins (reference points) which represent the incident points of the laser beam (for detecting the angle position) and the convergent bundle of rays (for detecting the axial position) mentioned above when the movable mirror 21 is in the correct position (predetermined angular and axial position). The angular deviation including the direction of deviation, and the axial deviation of the movable mirror 21 from the correct position can thus be detected, based on the reference points. Therefore, an operator can adjust the angle and axial position of the movable mirror 21 while observing the screen 31.

FIG. 4 shows a modified optical arrangement of a measuring apparatus according to the present invention. In this embodiment (second embodiment) illustrated in FIG. 4, the concave mirror 25 in FIG. 1 is replaced by a collimating lens 41 and a reflecting plane mirror 43. A center hole 42 is provided within the collimating lens 41 through which the laser beam passes. Namely, the laser beam reflected by the movable mirror 21 passes through the center hole 42 of the collimating lens 41 and is reflected by the reflecting plane mirror 43. The laser beam reflected by the plane mirror 43 passes through the center hole 42 of the collimating lens 41 again and is reflected by the movable mirror 21 toward the second half-mirror 19. The remaining construction and operation of the second embodiment illustrated in FIG. 4 is the same as that of the first embodiment illustrated in FIG. 1.

According to the optical arrangement shown in FIG. 4, it is not necessary to provide a separate reflecting mirror for reflecting the beam to detect the angle of the movable mirror 21, since the reflecting plane mirror 43 also serves as a reflecting mirror for reflecting the angle detecting beam.

As can be seen from the above discussion, according to the second embodiment of the present invention, since the angle and axial position of the movable mirror can be simultaneously measured and since the measurements are effected independently of one another, the adjustment of the angle and the axial position thereof can be easily effected.

Furthermore, since the convergent bundle of rays and the collimated small beam are obtained from the same light source (laser source 11), the number of necessary optical elements can be reduced and the overall size of the measuring apparatus can thereby be reduced.

Although the above discussion has been directed to the specific embodiment in which the separate devices for detecting the angle and the axial position of the movable mirror are provided to realize a simultaneous detection of both the angle and the axial position, it is also possible to use only one of the detecting devices. Furthermore, the measuring screen can be replaced with a CCD camera or the like.

As can be understood from the foregoing, since a measuring apparatus according to the present invention includes an auto collimating system having a point light source located at a predetermined reference point on a reflecting surface of a mirror at a predetermined correct position, a light emitting means for emitting detecting light onto the point light source in a direction inclined with respect to a normal to the reflecting surface of the mirror, and a position detecting means for detecting the deviation of the detecting light reflected by the mirror surface and reciprocally transmitted through the auto collimating system and reflected again by the mirror surface, a measuring optical apparatus in which the non-contact measurement of the position and the adjustment thereof are effected simultaneously can be realized.

Furthermore, since the measuring apparatus of the present invention further includes a beam emitting means for making a beam-like detecting light incident upon the reference point from the optical axis, a plane mirror having a reflecting surface perpendicular to the beam-like detecting light reflected by the mirror surface at the correct angular and axial position, and an angle detecting means for detecting angular deviation, based on the deviation of the beam-like detecting light reflected by the mirror surface, the plane mirror and the mirror surface, respectively, both the axial position and the angular position of the mirror surface can be independently and simultaneously measured.

I claim:
1. An apparatus for measuring the deviation from a specific position of a mirror surface, comprising:
   an auto collimating system in which a point light source is located at a reference point on a reflecting surface of said mirror surface located at a predetermined correct position;
   means for emitting detecting light onto said reference point along an incident optical axis inclined with respect to a normal of said mirror surface; and
   means for measuring a deviation from said correct position of the detecting light reflected by said mirror surface and reciprocally transmitted through said auto collimating system and reflected again by said mirror surface.

2. A measuring apparatus according to claim 1, wherein said auto collimating system comprises a concave mirror having a center of curvature located on said reflecting surface of said mirror surface.

3. A measuring apparatus according to claim 1, wherein said auto collimating system comprises a collimating lens having a focal point located on said reflecting surface of said mirror surface, and a plane mirror located optically behind said collimating lens.

4. A measuring apparatus according to claim 1, wherein said mirror surface is a surface of a quick return mirror of a single lens reflex camera.

5. An apparatus for measuring the deviation from a specific position of a mirror surface, comprising:
   an auto collimating lens system in which a point light source is located at a reference point on a reflecting surface of said mirror surface located at a predetermined correct position;
   means for emitting detecting light;
   a first convergent optical system for converging said detecting light emitted by said emitting means onto said reference point along an incident optical axis inclined with respect to a normal of said mirror surface at said reference point;

a second convergent optical system for converging said detecting light reflected by said mirror surface and said collimating lens system and again by said mirror surface; and, means for measuring a deviation of said mirror surface from said correct position, based on a deviation of the detecting light converged by the second convergent optical system from said correct position.

6. A measuring apparatus according to claim 5, wherein said first and second convergent optical systems are realized by a common convergent optical system.

7. A measuring apparatus according to claim 5, wherein said deviation measuring means comprises a measuring surface on which said detecting light is converged by said second convergent optical system.

8. A measuring apparatus according to claim 5, wherein said auto collimating lens system comprises a concave mirror having a center of curvature located on said reflecting surface of the mirror surface.

9. A measuring apparatus according to claim 5, wherein said auto collimating lens system comprises a collimating lens having a focal point located on said reflecting surface of said mirror surface, and a plane mirror located optically behind said collimating lens.

10. An apparatus for measuring the deviation from a specific position of a mirror surface, comprising;

an auto collimating lens system in which a point light source is located at a reference point on a reflecting surface of said mirror surface located at a predetermined correct angular and axial position;

means for emitting detecting light;

a convergent optical system for converging said detecting light emitted by said emitting means onto said reference point from an incident optical axis inclined with respect to a normal to said mirror surface at said reference point;

means for measuring a deviation of said detecting light reflected by said mirror surface and reciprocally transmitted through said auto collimating lens system, and reflected again by said mirror surface to be converged by said convergent optical system, from said correct position;

means for emitting beam-like detecting light onto said reference point from the optical axis;

a plane mirror having a reflecting surface perpendicular to said beam-like detecting light reflected by said mirror surface at said correct angular and axial position; and, means for detecting an inclination angle of said mirror surface with respect to said correct angular position, based on a deviation of said beam-like detecting light reflected by said mirror surface and said plane mirror and by said mirror surface again, from said correct position.

11. A measuring apparatus according to claim 10, wherein said auto collimating lens system comprises a concave mirror having a center of curvature located on said reflecting surface of said mirror surface.

12. A measuring apparatus according to claim 11, wherein said concave mirror is provided with a plane mirror which reflects said beam-like detecting light.

13. A measuring apparatus according to claim 10, wherein said auto collimating lens system comprises a collimating lens having a focal point located on said reflecting surface of said mirror surface, and a plane mirror located optically behind said collimating lens.

14. A measuring apparatus according to claim 13, wherein said collimating lens system comprises a center hole through which said beam-like detecting light passes.

15. A measuring apparatus according to claim 14, wherein said plane mirror serves as a plane mirror for reflecting said beam-like detecting light.

16. A measuring apparatus according to claim 10, wherein said angle detecting means and said position detecting means have measuring surfaces for receiving said detecting light, respectively.

17. A measuring apparatus according to claim 10, wherein said light emitting means and said beam emitting means comprise a common laser source.

18. A measuring apparatus according to claim 17, further comprising a beam splitter for splitting the laser emitted by said laser source, one beam of which is converged onto said reference point by said convergent optical system, and another beam is used for said beam-like detecting light.

* * * * *